(12) United States Patent
Yan (10) Patent No.: US 10,175,842 B2
(45) Date of Patent: Jan. 8, 2019

(54) ARRAY SUBSTRATE AND DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventor: Huasheng Yan, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/958,972

(22) Filed: Apr. 20, 2018

(65) Prior Publication Data

US 2018/0239466 A1 Aug. 23, 2018

Related U.S. Application Data

(63) Continuation of application No. 14/829,631, filed on Aug. 18, 2015, now Pat. No. 9,983,743.

(30) Foreign Application Priority Data

May 8, 2015 (CN) .......................... 2015 1 0232989

(51) Int. Cl.
*G06F 3/041* (2006.01)
*G06F 3/044* (2006.01)
(52) U.S. Cl.
CPC ............ *G06F 3/044* (2013.01); *G06F 3/0412* (2013.01)

(58) Field of Classification Search
CPC .................. G06F 3/044; G06F 3/0412; G09G 2300/0408; G02F 1/13338
See application file for complete search history.

(56) References Cited

U.S. PATENT DOCUMENTS

| | | | |
|---|---|---|---|
| 9,081,458 B2 | 7/2015 | Zhou et al. | |
| 2010/0194697 A1 | 8/2010 | Hotelling et al. | |
| 2010/0289994 A1 | 11/2010 | Nonaka | |
| 2012/0154308 A1 | 6/2012 | Jeon et al. | |
| 2013/0328812 A1 | 12/2013 | Kim et al. | |
| 2014/0176465 A1 | 6/2014 | Ma et al. | |
| 2014/0375603 A1 | 12/2014 | Hotelling et al. | |
| 2015/0115271 A1 | 4/2015 | Yoon et al. | |

(Continued)

FOREIGN PATENT DOCUMENTS

| | | |
|---|---|---|
| CN | 101825966 A | 9/2010 |
| CN | 101887189 A | 11/2010 |

(Continued)

*Primary Examiner* — Abbas I Abdulselam
(74) *Attorney, Agent, or Firm* — Faegre Baker Daniels LLP (57) ABSTRACT

An array substrate and a display panel. The array substrate includes: a plurality of data lines and a plurality of scan lines; at least one sub-pixel unit defined by the data lines and the scan lines; and a plurality of touch electrodes, comprising drive electrodes and touch sensing electrodes intersecting the drive electrodes; wherein, in a touch phase, at least one of the touch electrodes is electrically connected with the corresponding data line, so that a driving signal is transmitted to or a sense signal is received from the at least one of the touch electrodes via the corresponding data line electrically connected with the at least one of the touch electrodes.

20 Claims, 8 Drawing Sheets

(56) References Cited

U.S. PATENT DOCUMENTS

| | | | | |
|---|---|---|---|---|
| 2016/0247478 A1* | 8/2016 | Ishige | ................... | G09G 3/3677 |
| 2016/0266697 A1* | 9/2016 | Cheng | ................... | G06F 3/0416 |
| 2016/0299594 A1 | 10/2016 | Zhang et al. | | |
| 2016/0334934 A1* | 11/2016 | Mo | ....................... | G06F 3/0416 |
| 2016/0364065 A1* | 12/2016 | Ding | ....................... | G06F 3/044 |

FOREIGN PATENT DOCUMENTS

| | | |
|---|---|---|
| CN | 103135849 A | 6/2013 |
| CN | 103150069 A | 6/2013 |
| CN | 103293785 A | 9/2013 |
| CN | 103454800 A | 12/2013 |
| CN | 103698927 A | 4/2014 |

\* cited by examiner

ARRAY SUBSTRATE AND DISPLAY PANEL

CROSS-REFERENCE TO RELATED APPLICATION

This application is a continuation of U.S. application Ser. No. 14/829,631, filed Aug. 18, 2015, which claims priority to Chinese Application No. 201510232989.3, filed May 8, 2015, all of which are herein incorporated by reference in their entirety.

TECHNICAL FIELD

The present disclosure relates to the field of display technologies, in particular to an array substrate having a touch sensing function and a display panel including the array substrate.

BACKGROUND

In the field of display technologies, it has been popular to integrate both a display function and a touch sensing function into a display panel to effectively reduce the thickness of the display panel. Touch sensing technologies employed in the display panel usually include a capacitive touch sensing technology and an electromagnetic touch sensing technology, and the capacitive touch sensing technology may include a self-capacitive touch sensing technology and a mutual capacitive touch sensing technology. According to the mutual capacitive touch sensing technology, drive electrodes and touch sensing electrodes are disposed on a substrate, driving signals are applied to the drive electrodes in detecting a touch, and sense signals from the touch sensing electrodes are detected to determine the presence of the touch and further a position of the touch. Thus, signal lines are correspondingly provided for the drive electrodes and the touch sensing electrodes in the display panel, so that the driving signals are transmitted to the drive electrodes via the signal lines provided for the drive electrodes, and the sense signals are received from the touch sensing electrodes via the signal lines provided for the touch sensing electrodes.

Figure 1:
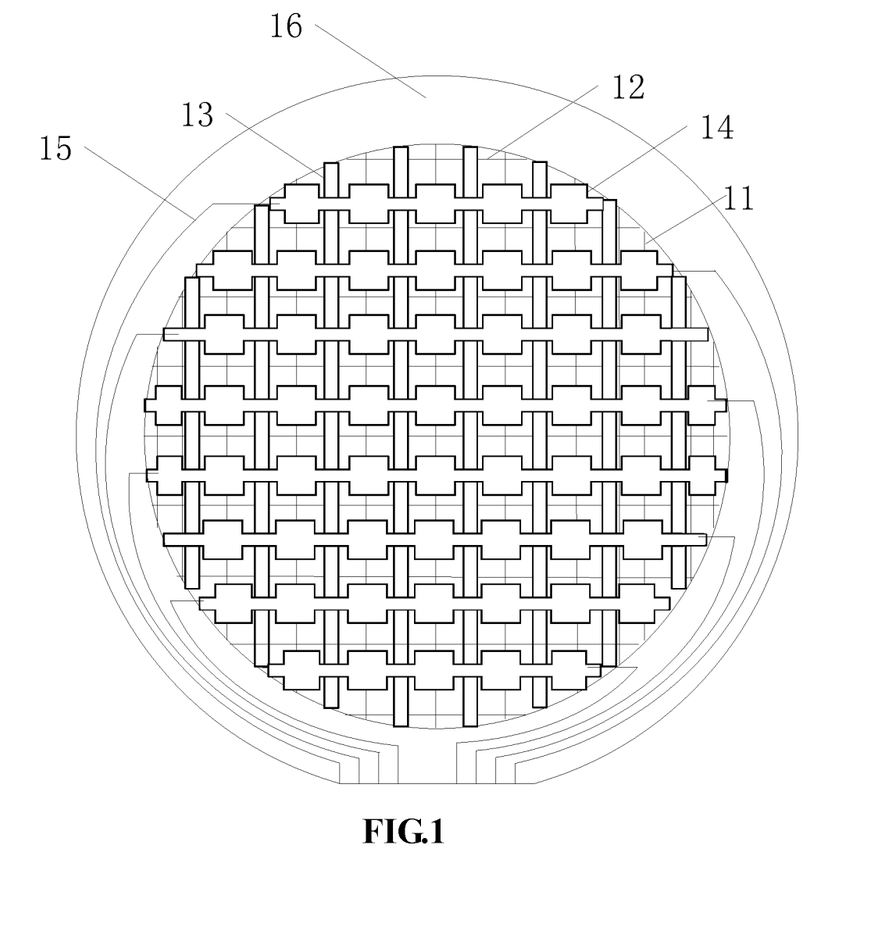
FIG. 1 is a schematic diagram showing the structure of a circular array substrate in the related art.

FIG. 1 is a schematic diagram showing the structure of a circular array substrate in the related art. As shown in FIG. 1, data lines 11 and scan lines 12 are disposed on the array substrate, and the data lines 11 intersect the scan lines 12 to form a plurality of sub-pixel units on the array substrate. To achieve a touch sensing function of the display panel, a plurality of drive electrodes 13 and a plurality of touch sensing electrodes 14 are further disposed on the array substrate, an extending direction of the drive electrodes 13 is perpendicular to that of the touch sensing electrodes 14, and an extending direction of the touch sensing electrodes 14 is perpendicular to that of the data lines 11. One end of each touch sensing electrode 14 is connected to a sense signal line 15, which is led out through a non-display region 16 located at both lateral sides of the array substrate, thus some space of the non-display region 16 is occupied by the sense signal lines 15 provided for the touch sensing electrodes 14.

The extending direction of the touch sensing electrodes 14 and the extending direction of the data lines 11 are shown as perpendicular to each other for example in FIG. 1, in this case, the sensing signal lines 15 provided for the touch sensing electrodes 14 are led out from both the lateral sides of the array substrate and hence occupy a large area of the non-display region 16. Alternatively, in the case that the extending direction of the drive electrodes is perpendicular to the extending direction of the touch sensing electrodes as well as the extending direction of the data lines, a signal line provided for each of the drive electrodes is connected to one end of the drive electrode and led out, thus occupying the area of the non-display region, thereby causing a large border frame region of the display panel and failing to meet user requirements for a narrow border frame.

SUMMARY

The present disclosure provides an array substrate and a display panel to provide a narrow border frame of the display panel.

In a first example, the disclosure provides an array substrate, including:
a plurality of data lines and a plurality of scan lines;
at least one sub-pixel unit defined by the data lines and the scan lines; and
a plurality of touch electrodes, comprising drive electrodes and touch sensing electrodes intersecting the drive electrodes;
wherein, in a touch phase, at least one of the touch electrodes is electrically connected with the corresponding data line, so that a driving signal is transmitted to or a sense signal is received from the at least one of the touch electrodes via the corresponding data line electrically connected with the at least one of the touch electrodes.

In a second example, the disclosure provides a display panel, including the array substrate described in the first example.

In the disclosure, the data line is electrically connected with at least one of the touch sensing electrodes in the touch stage, so that the at least one of the data lines is used to transmit signals for the touch electrodes. The data line is reused as the signal line for transmitting the signals for the touch electrodes, so that the signal lines for the touch electrodes on the non-display region of the array substrate are reduced, thereby accordingly reducing the area of the non-display region of the array substrate occupied by the signal lines for the touch electrodes and achieving the narrow border frame of the display panel.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions of the embodiments of the disclosure, the drawings used for the description of the embodiments are briefly introduced below. Obviously, the drawings for the following description only show some embodiments of the invention, and other drawings may also be obtained from the described drawings.

While the disclosure is amenable to various modifications and alternative forms, embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the disclosure more clear, the technical solutions of the disclosure are described below with reference to the accompanying drawings and embodiments of the disclosure. Obviously, merely some instead of all embodiments of the disclosure are described herein. All other embodiments obtained in light of the described embodiments of the disclosure fall within the scope of the disclosure.

Embodiments of the disclosure provide an array substrate, including a plurality of data lines, a plurality of scan lines and touch electrodes, where at least one sub-pixel unit is defined by insulatedly intersecting the data lines with the scan lines, and the touch electrodes include drive electrodes and touch sensing electrodes intersecting the drive electrodes. Optionally, an extending direction of the drive electrodes is perpendicular to that of the touch sensing electrodes, or an angle α is formed between the extending direction of the drive electrodes and the extending direction of the touch sensing electrodes, where α is unequal to 0° or 180°.

It is known that each sub-pixel unit is generally connected with both one scan line and one data line, and in a display phase, the sub-pixel unit is electrically connected with the data line under the control of the scan line so that a signal is transmitted to the sub-pixel unit via the data line, while in a touch phase, the sub-pixel unit is disconnected from the data line under the control of the scan line. The data line disconnected from the sub-pixel unit in the touch phase is idle in the related art, but is electrically connected with at least one of the touch electrodes in the touch phase according to embodiments of the present disclosure, that is, the data line disconnected from the sub-pixel unit is not idle in the touch phase but operates as a signal line for the touch electrode to transmit a driving signal to the touch electrode or receive a sense signal from the touch electrode.

In particular, in the touch phase, at least one of the drive electrodes is electrically connected with the data line so that a driving signal is allowed to be transmitted to the at least one of the drive electrodes via the data line. Alternatively, at least one of the touch sensing electrodes is electrically connected with the data line so that a sense signal may be received from the at least one of the touch sensing electrodes via the data line. As such, at least one of the touch electrodes is electrically connected with the data line disconnected from the sub-pixel unit in the touch phase, so that a driving signal is transmitted to or a sense signal is received from the at least one of the touch electrodes via the data line.

As described above, in the related art, the signal lines for the touch electrodes are led out from both lateral sides of the array substrate and hence occupy a large area of the non-display region of the array substrate. In embodiments of the disclosure, however, in the touch phase, the data line is electrically connected with at least one touch electrode, so that a driving signal can be transmitted to or a sense signal can be received from the at least one touch electrode via the data line, and driving signals are transmitted to or sense signals are received from other touch electrodes not connected with the data line via the signal lines in the non-display region of the array substrate.

Optionally, the at least one of the touch electrodes is connected with one data line, or different touch electrodes are respectively connected with different data lines.

As such, according to embodiments of the disclosure, at least one data line operates as a signal line for the touch electrode in the touch phase for the purpose of signal transmission to or from the touch electrode, so that the signal lines for the touch electrodes on the array substrate are reduced, thereby accordingly reducing the area of the non-display region of the array substrate occupied by the signal lines for the touch electrodes, to achieve a narrow border frame of the display panel.

In embodiments described above, at least one of the touch electrodes is electrically connected with the data line, to transmit a driving signal to or receive a sense signal from the at least one of the touch electrodes via the data line.

Figure 2A:
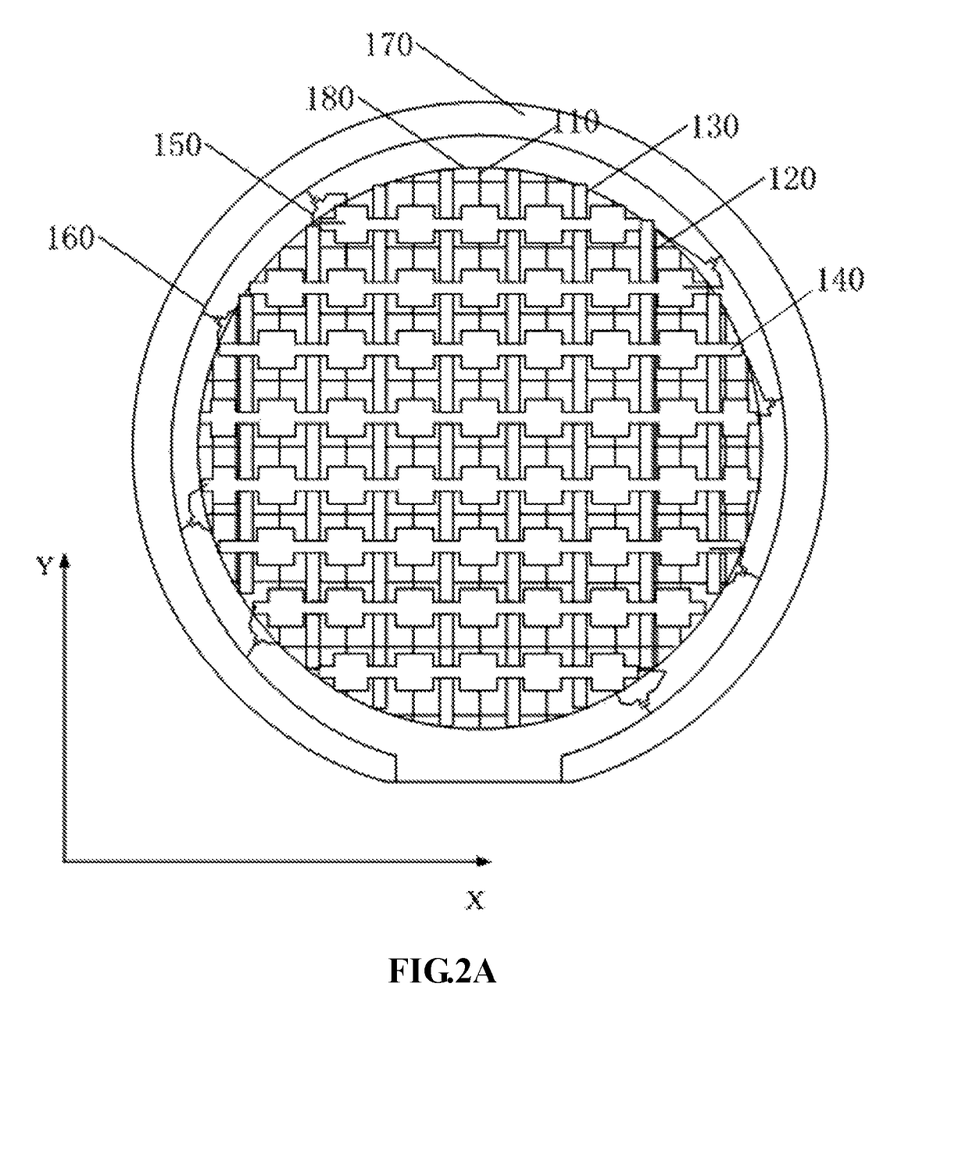
FIG. 2A is a schematic diagram of an array substrate, according to embodiments of the disclosure.

FIG. 2A is a schematic diagram of an array substrate, according to embodiments of the disclosure. A technical solution of the embodiments is suitable for reducing an area of the border frame region of the display panel occupied by the signal lines for the touch electrodes, and the array substrate can be provided in a liquid crystal display panel or an Organic Light Emitting Diode (OLED) display panel. Optionally, at least one of the touch electrodes is electrically connected with the data line in the touch phase.

As shown in FIG. 2A, the array substrate includes: a plurality of data lines 110, a plurality of scan lines 120 and touch electrodes. At least one sub-pixel unit is defined by insulatedly intersecting the plurality of data lines 110 with the plurality of scan lines 120, and the touch electrodes include drive electrodes 130 and touch sensing electrodes 140 intersecting the drive electrodes 130. An extending direction of the drive electrodes 130 is perpendicular to that of the touch sensing electrodes 140 and is parallel to that of the data lines 110, and the extending direction of the touch sensing electrodes 140 is perpendicular to that of the data lines 110. Herein, it is specifically configured that the extending direction of the data lines 110 is represented by a direction of a Y coordinate axis, the extending direction of the touch sensing electrodes 140 is represented by a direction of an X coordinate axis, and the X coordinate axis is perpendicular to the Y coordinate axis.

It is known that the scan lines 120 and the data lines 110 are both connected with the sub-pixel units. In the display phase, the sub-pixel units are electrically connected with the corresponding data lines 110 under the control of the scan lines 120 so that signals are transmitted to the sub-pixel units via the data lines 110, while in the touch phase, the sub-pixel units are disconnected from the corresponding data lines 110 and at least one touch sensing electrode 140 is electrically connected with at least one data line 110, respectively, so that a signal from the at least one touch sensing electrode 140 is transmitted via the at least one data line 110. From the above, in the touch phase, at least one the touch electrode is electrically connected with the corresponding data line, so that a sense signal from the at least one touch electrode electrically connected with the data line is transmitted via the data line.

In embodiments shown in FIG. 2A, the touch electrodes parallel to the extending direction of the data lines 110 are drive electrodes 130. In this case, since an extending direction of the drive electrodes 130 is parallel to that of the data lines 110, without intersections between the data lines 110 and the drive electrodes 130, an extending direction of signal lines for the drive electrodes 130 is parallel to that of the data lines 110, thus the signal lines for the drive electrodes 130 will not occupy an excess area of the non-display region 170 of the array substrate, and therefore it is not necessary that the data line 110 operates as the signal line for the drive electrode 130 (which parallel to the extending direction of the data line 110) in the touch phase. As such, the at least one touch electrode electrically connected with the data line 110 in the touch phase is the touch sensing electrode 140, if the extending direction of the drive electrodes 130 is parallel to that of the data lines 110. Optionally, the at least one touch electrode electrically connected with the data line 110 extends in an extending direction perpendicular to the extending direction of the data line 110.

In the related art, if an extending direction of the touch electrodes (such as the touch sensing electrodes 140 shown in FIG. 2A) intersects that of the data lines 110, the signal lines for the touch electrodes are led out from both lateral sides of the array substrate and hence occupy a large area of the non-display area 170. However, as shown in FIG. 2A, if the extending direction of the data lines 110 is perpendicular to that of the touch sensing electrodes 140 and the data lines 110 intersect the touch sensing electrodes 140 on the array substrate, the data line 110 is selectively connected electrically with at least one of the touch sensing electrodes 140 and thus can operate as the signal line for the at least one of the touch sensing electrodes 140. Therefore, the data line can be reused as the signal line for the touch electrode in the present disclosure.

In the touch phase, the data line 110 is electrically connected with at least one of the touch sensing electrodes 140, so that the sense signal from the at least one of the touch sensing electrodes 140 may be let out via the data line 110, but for the drive electrodes 130 not electrically connected with the data lines 110, signals to the drive electrodes 130 are transmitted via the signal lines for the drive electrodes 130 disposed in the non-display region 170 of the array substrate. As such, the data line can be used to output the sense signal from the touch electrode electrically connected with the data line.

Therefore, at least one data line 110 is reused as the signal line for at least one touch electrode, so that the signal lines for the touch electrodes on the array substrate are reduced, thereby accordingly reducing the area of the non-display region 170 of the array substrate occupied by the signal lines for the touch electrodes and achieving the narrow border frame of the display panel.

Figure 2B:
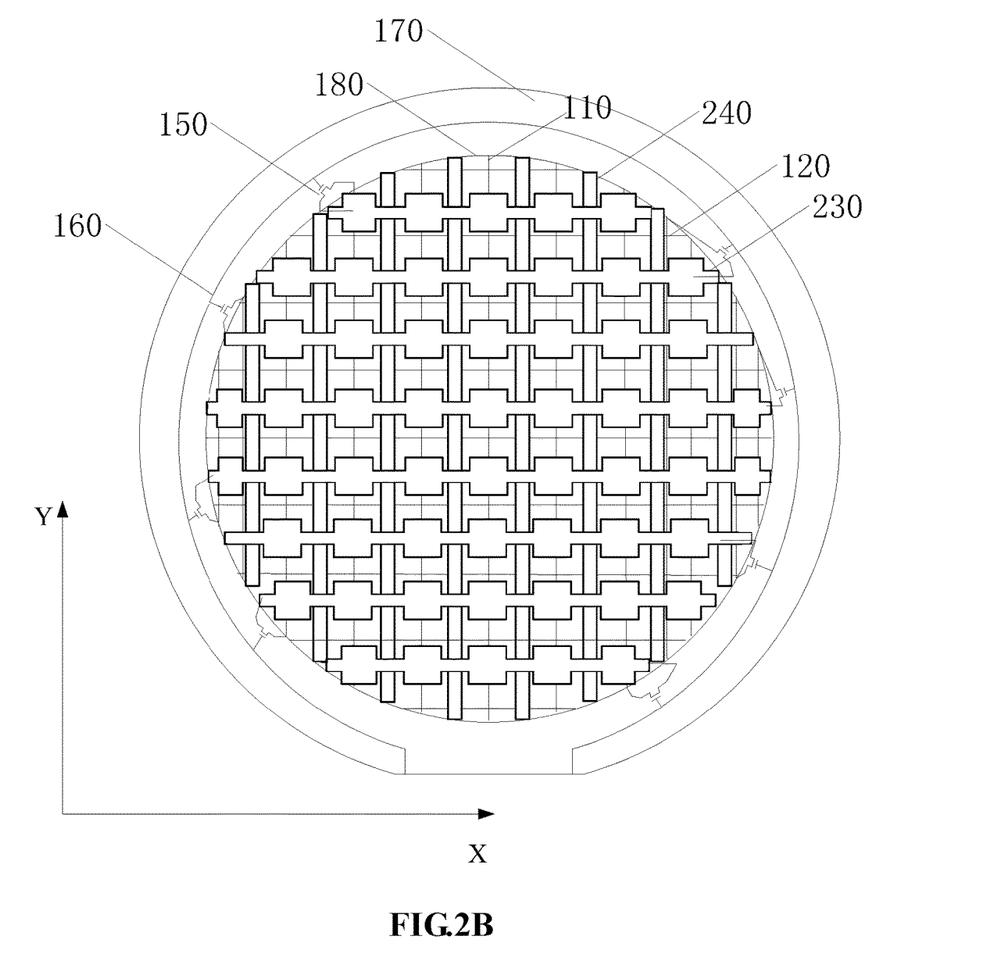
FIG. 2B is a schematic diagram of another array substrate, according to embodiments of the disclosure.

In embodiments shown in FIG. 2A, the touch electrodes parallel to the extending direction of the data lines 110 are described as the drive electrodes 130, but the drive electrodes 130 and the touch sensing electrodes 140 can be exchanged. As shown in FIG. 2B, the array substrate includes data lines 110, scan lines 120, drive electrodes 230, touch sensing electrodes 240, first switches 150, a control signal line 160, a non-display region 170 and a display region 180. An extending direction of the drive electrodes 230 is perpendicular to that of the touch sensing electrodes 240 as well as that of the data lines 110, and the extending direction of the touch sensing electrodes 240 is parallel to that of the data lines 110. Herein, it is configured that the extending direction of the data lines 110 is represented by a direction a Y coordinate axis, the extending direction of the touch sensing electrode 140 is represented by a direction of an X coordinate axis, and the X coordinate axis is perpendicular to the Y coordinate axis.

As shown in FIG. 2B, the touch electrodes parallel to the extending direction of the data lines 110 are the touch sensing electrodes 240, and the touch electrodes intersecting the extending direction of the data lines 110 are the drive electrodes 230. In this case, electrically connecting at least one touch electrode with the data line 110 in the touch phase is embodied as electrically connecting at least one drive electrode 230 with the data line 110. Here, the at least one touch electrode electrically connected with the data line 110 extends in an extending direction perpendicular to that of the data line 110.

As such, in the case that the extending direction of the drive electrodes 230 is perpendicular to that of the data lines 110, at least one drive electrode 230 is electrically connected with the corresponding data line 110 so that a signal to the at least one drive electrode 230 is transmitted via the corresponding data line 100.

When the data line 110 is electrically connected with the drive electrode 230, a driving signal may be inputted to the drive electrode 230 electrically connected with the data line 110 via the data line 110. Therefore, the data line 110 can be used to input the driving signal to the touch electrode electrically with the data line 110.

In embodiments shown in FIG. 2B, it is illustratively shown that the extending direction of the drive electrodes 230 is perpendicular to that of the touch sensing electrodes 240 and that of the data lines 110, and the extending direction of the data lines 110 is parallel to that of the touch sensing electrodes 240. In this case, a driving signal can be inputted to a drive electrode 230 intersecting the extending direction of the data lines 110 via the data line 110 corresponding to the drive electrode 230, and a sense signal generated on the touch sensing electrode 240 is let out via a sense signal line (not shown) for the touch sensing electrode 240 as usual.

In embodiments described above, the extending direction of the drive electrodes 230 is perpendicular to that of the data lines 110 and a driving signal is transmitted to at least one touch electrode 230 via the data line 110 in the touch phase, or the extending direction of the touch sensing electrodes 140 is perpendicular to that of the data lines 110 and a sense signal from at least one touch electrode 140 is outputted via the data line 110 in the touch phase. In addition to this, however, both the extending direction of the drive electrodes and the extending direction of the touch sensing electrodes may intersect that of the data lines 110, and the extending direction of the drive electrodes intersects that of the touch sensing electrodes, so that not only a driving signal is transmitted to at least one touch electrode via the data line 110 in the touch phase, but also a sense signal from at least one touch electrode is outputted via the data line 110 in the touch phase.

In embodiments of the disclosure, the data lines 110 are reused as signal lines for the touch electrodes. At least one of the touch electrodes is electrically connected with the data line 110. The signal line for each touch electrode can be led out from (i.e. connected with) one end of the touch electrode, and the touch electrode is located within the display region 180 of the array substrate, with both ends of the touch electrode being located at the edge of the display region 180, thus the data line 110, which is reused as a signal line for a touch electrode electrically connected with the data line 110, is intended to be connected with one end of the touch electrode, and hence it is that the data line 110 overlaps with the touch electrode electrically connected with the data line 110 at the edge of the display region 180 of the array substrate. In embodiments, as shown in FIG. 2B, the data lines overlap with the drive electrodes 230 at the edge of the display region 180 of the array substrate.

It can be seen from the above that at least one touch electrode is electrically connected with the corresponding data line 110 in the touch phase, and the at least one touch electrode is disconnected from the data line 110 in the display phase so that a signal is transmitted to a sub-pixel unit corresponding to the data line 110 via the data line 110. Thus, the array substrate is further provided with at least one first switch 150, which is configured to electrically connect at least one touch electrode with the data line 110 in the touch phase and disconnect the at least one touch electrode from the data line 110 in the display phase.

Further, the array substrate is further provided with the control signal line 160, which is configured to control the first switch 150 to be closed in the touch phase and opened in the display phase. Optionally, the first switch 150 is embodied as a first thin film transistor, where α gate electrode of the first thin film transistor is connected with the control signal line 160, a drain electrode of the first thin film transistor is connected with at least one touch electrode, and a source electrode of the first thin film transistor is connected with the data line 110 corresponding to the at least one touch electrode. The drain electrode of the first thin film transistor is connected with an end of the touch electrode.

In the touch phase, the control signal line 160 controls the first switch 150 to be closed, so that a driving signal is transmitted to the touch electrode via the data line 110 or a sense signal is outputted from the touch electrode via the data line 110, that is, at least one data line 110 is reused as the signal line for the touch electrode. In the display phase, the control signal line 160 controls the first switch 150 to be opened, so that the data line 110 is disconnected from the touch electrode but is connected with the corresponding sub-pixel unit.

In the case that the first switch 150 is embodied as the first thin film transistor, it is noted that the first thin film transistor may be connected with the data line 110 and the touch electrode in such a way that: a gate electrode of the first thin film transistor is connected with the control signal line 160, a source electrode of the first thin film transistor is connected with at least one touch electrode, and a drain electrode of the first thin film transistor is connected with the data line 110 corresponding to the at least one touch electrode. In this case, since the source electrode of the first thin film transistor is connected with the touch electrode, the data line 110 is reused as the signal line for the touch electrode when the control signal line 160 controls the first switch 150 to be closed in the touch phase.

It is noted that the touch electrode can be connected with either the source electrode or the drain electrode of the first thin film transistor by a via if the data line 110 is located at a layer different from the touch electrode.

As described above, given that the touch electrode is overlapped with the corresponding data line 110 at the edge of the display region 180 of the array substrate, the gate electrode of the first thin film transistor is connected with the control signal line 160, and either a source electrode of a drain electrode of the first thin film transistor is connected with the data line 110, at least one of the first thin film transistor and the control signal line 160 is disposed in the non-display region 170 of the array substrate.

The first thin film transistor may be embodied as an N-type thin film transistor or a P-type thin film transistor. If the first thin film transistor is embodied as the N-type thin film transistor, in the display phase, a low level signal is applied to the control signal line 160 so that the first thin film transistor is turned off, and thus the data line 110 is connected with a sub-pixel unit without affecting normal displaying of an image; while in the touch phase, a high level signal is applied to the control signal line 160 so that all of the first thin film transistors are turned on, so that at least one data line 110 is reused as a signal line for the touch electrode to transmit or receive a signal to or from the touch electrode.

In the present disclosure, since at least one data line 110 is reused as the signal lines for the touch electrodes, only one control signal line 160 and/or the first thin film transistors are provided in the non-display region 170 of the array substrate. In comparison with the related art, the signal lines for the touch electrodes in the non-display region 170 of the array substrate are reduced, and the space required for the signal lines for the touch electrode signals is saved, thereby accordingly reducing the area of the non-display region 170 of the array substrate and achieving the narrow border frame of the display panel.

The display region 180 of the array substrate is illustratively circular, and the control signal line 160 is disposed around the display region 180 and connected with at least one first switch 150.

Figure 2C:
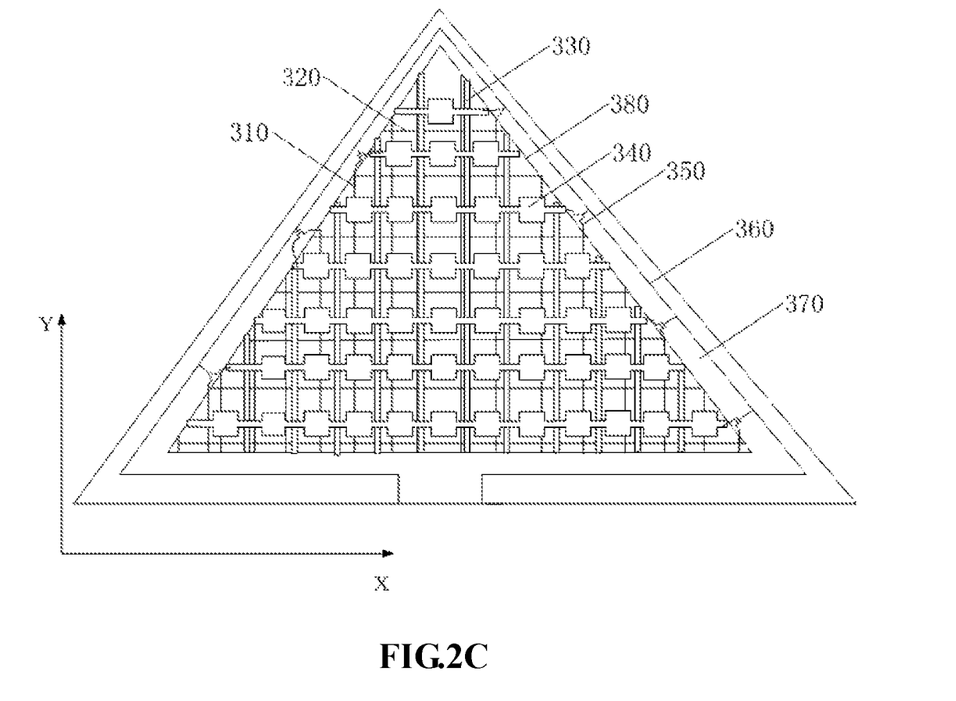
FIG. 2C is a schematic diagram of a further array substrate, according to embodiments of the disclosure.

Certainly, the display region 180 of the array substrate can also be of a shape other than the circular shape. FIG. 2C is a schematic diagram of another array substrate, according to embodiments of the disclosure. As shown in FIG. 2C, the array substrate includes data lines 310, scan lines 320, drive electrodes 330, touch sensing electrodes 340, first switches 350, a control signal line 360, a non-display region 370 and a display region 380. The display region 380 is triangular. An extending direction of the touch sensing electrodes 340 is perpendicular to both that of the drive electrodes 330 and that of the data line 310, and thus the touch sensing electrodes 340 overlap with the corresponding data lines 310 at the edge of the display region 380 and at least one of the data lines 310 can be reused as signal lines for the touch electrodes.

In the touch phase, the control signal line 360 controls the first switch 350 to be closed, so that the data line 310 is reused as a signal line for the touch sensing electrode 340 corresponding to the data line 310, and a sense signal is outputted from the touch sensing electrode 340 via the data line 310, but the drive electrode 330 receives a driving signal via the driving signal line (not shown) for the drive electrode 330 as usual. In the display phase, the control signal line 360 controls the first switch 350 to be opened, so that the data line 310 is connected with the corresponding sub-pixel unit to transmit a signal to the sub-pixel unit.

From the above, given that the data line 310 is overlapped with the touch electrode at the edge of the display region 380 in the case that the data line 310 is reused as the signal line for the touch electrode, the display region 380 may be of a polygonal shape, and at least one edge of the polygonal shape forms an angle β relative to the extending direction of the data lines 310, where β is unequal to 0°, 90° or 180°, so that the data line 310 is overlapped with the touch electrode at the edge of the display region 380. Herein, the display region 380 is shown as triangular in FIG. 2C.

Figure 2D:
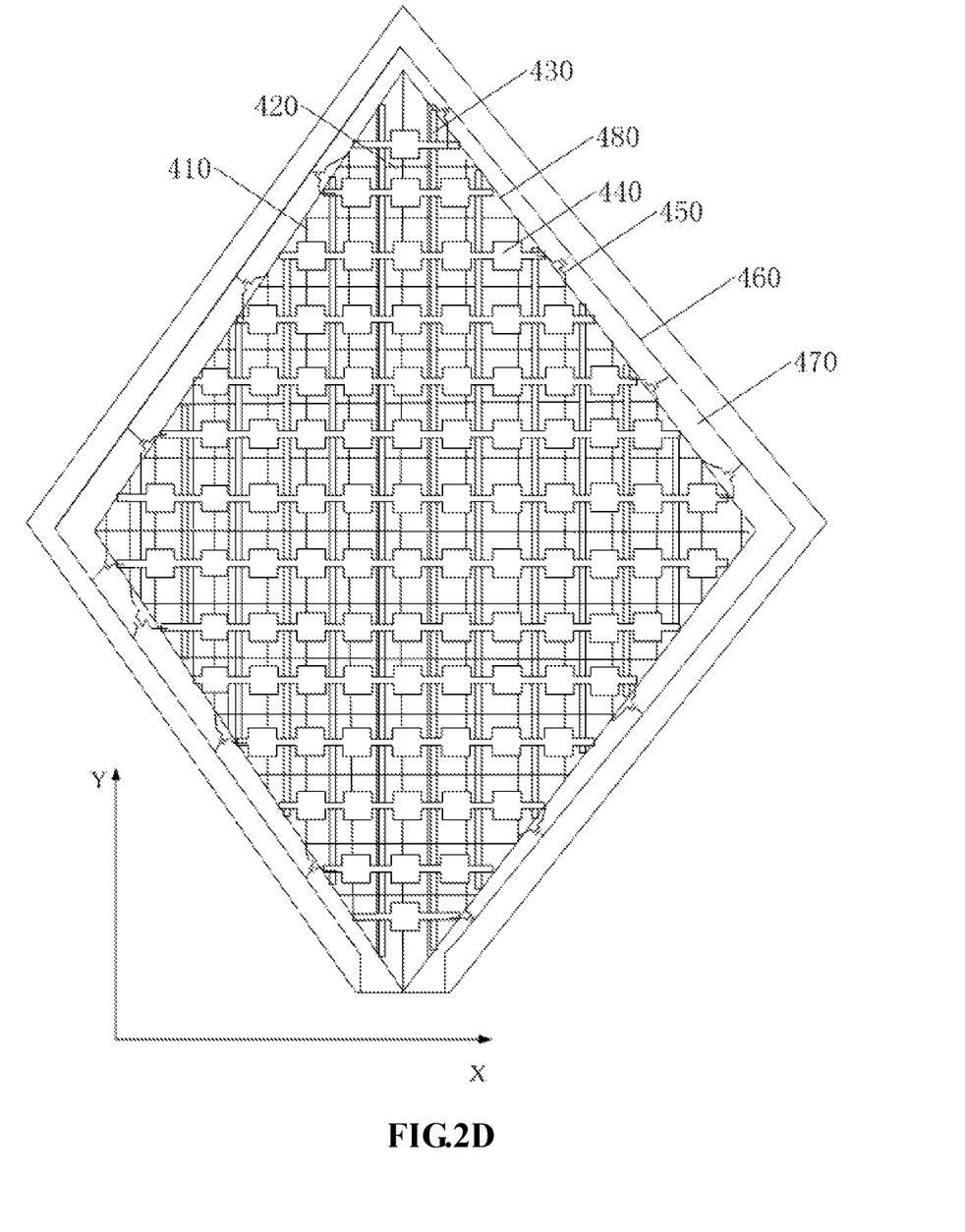
FIG. 2D is a schematic diagram of yet another array substrate, according to embodiments of the disclosure.

FIG. 2D is a schematic diagram of another array substrate, according to embodiments of the disclosure. As shown in FIG. 2D, the array substrate includes data lines 410, scan lines 420, drive electrodes 430, touch sensing electrodes 440, first switches 450, a control signal line 460, a non-display region 470 and a display region 480. The display region 480 has a diamond shape. The touch sensing electrodes 440 are perpendicular to the drive electrodes 430 and the data lines 410. In the diamond display region 480, each touch sensing electrode 440 overlaps with one of the data lines 410 at the edge of the display region 480, and at least one of the data lines 410 can be reused as a signal line for the touch electrode.

In the touch phase, the control signal line 460 controls the first switch 450 to be closed, and the data line 410 overlapped with the touch sensing electrode 440 at the edge of the display region 480 can be reused as the signal line for the touch sensing electrode 440, so that a sense signal is outputted from the touch sensing electrode 440 via the data line 410, but the drive electrode 430 receives the driving signal via the driving signal line (not shown) for the drive electrode 430 as usual. In the display phase, the control signal line 460 controls the first switch 450 to be opened, and the data line 410 is connected with the sub-pixel unit to transmit a signal to the sub-pixel unit.

From the above, given that the data line 410 is overlapped with the touch electrode at the edge of the display region 480 in the case that the data line 410 is reused as the signal line for the touch electrode, the display region 480 may be of a polygonal shape, and at least one edge of the polygonal shape is neither parallel to nor perpendicular to the extending direction of the data lines 410, so that the data line 410 can be overlapped with the touch electrode at the edge of the display region 480. Herein, the polygonal display region 480 illustratively has a diamond shape.

It is noted that the display region may have a pentagonal or hexagonal shape and so on, and at least one edge of the pentagonal or hexagonal shape forms an angle β relative to the extending direction of the data lines, where β is unequal to 0°, 90° or 180°.

With the array substrate, according to embodiments of the disclosure, in the touch phase, at least one touch electrode is electrically connected with at least one data line, respectively, so that at least one data line is reused as the signal line for the corresponding touch electrode to transmit a signal to or receive a signal from the touch electrode via the data line. Reusing the data line as the signal line for the touch electrode reduces the signal lines for the touch electrodes in the array substrate, saves the area of the non-display region of the array substrate occupied by the signal lines for the touch electrodes, and achieves the narrow border frame of the display panel.

In the array substrate of the present disclosure, if the drive electrodes intersect the touch sensing electrodes at the same layer, the drive electrodes each continuously extend across the touch sensing electrodes by bridges, or the touch sensing electrodes each continuously extend across the drive electrodes by bridges.

In embodiments of the disclosure described above, it is noted that the touch electrodes electrically connected with the data lines can include either the touch sensing electrodes 140 (as shown in FIG. 2A) or the drive electrodes 230 (as shown in FIG. 2B). In other embodiments of the present disclosure, the touch electrodes electrically connected with the data lines can include both the touch sensing electrodes and the drive electrodes, where, preferably both the drive electrodes and the touch sensing electrodes intersect the data lines.

Given that the touch electrodes include drive electrodes and touch sensing electrodes intersecting the drive electrodes, in other embodiments, the drive electrodes can be configured to extend in an inclined arrangement and intersect the touch sensing electrodes, or extend along an extending direction perpendicular to the data lines and intersect the touch sensing electrodes. In the case that the extending direction of the drive electrodes intersects that of the data lines and the extending direction of the touch sensing electrodes is parallel to that of the data lines, in the touch phase, it is possible that driving signal is inputted to the drive electrode via the data line corresponding to the driving signal, but the sense signal is outputted from the touch sensing electrode via the sense signal line corresponding to the touch sensing electrode as usual.

In addition, if the extending direction of the drive electrodes intersects that of the data lines and the extending direction of the touch sensing electrodes intersects that of the data lines, at least one drive electrode can be electrically connected with the corresponding data line so that the driving signal is transmitted to the drive electrode via the corresponding data line electrically connected with the drive electrode, and/or at least one touch sensing electrode can be electrically connected with the corresponding data line so that the sense signal on the touch sensing electrode is led out via the corresponding data line electrically connected with the touch sensing electrode.

Figure 3:
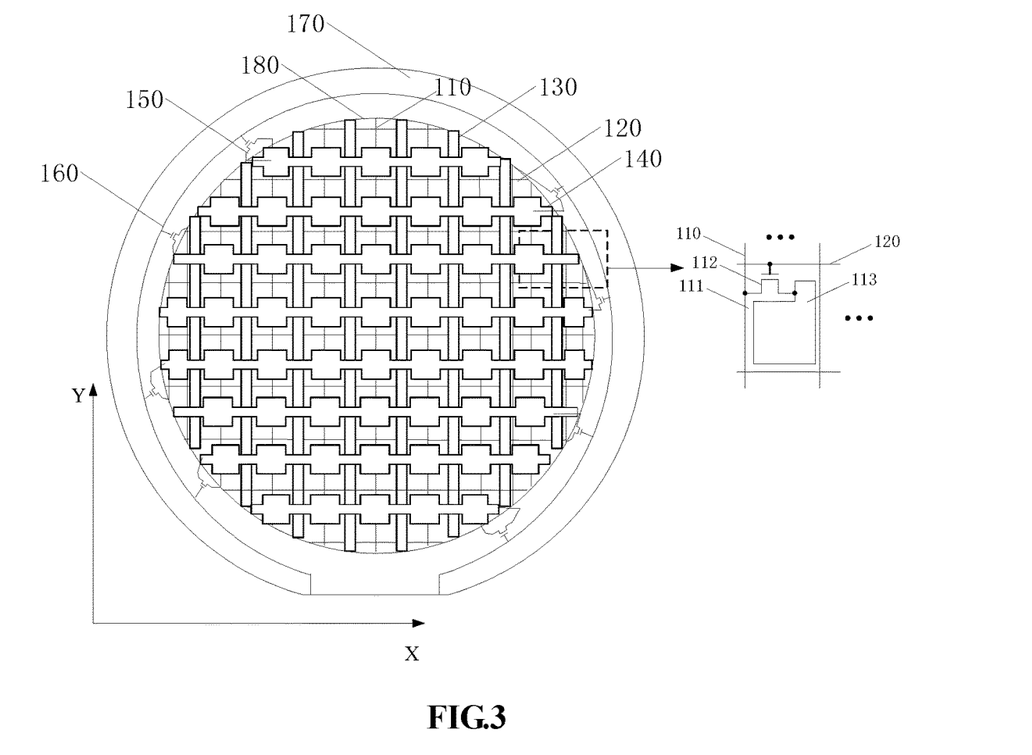
FIG. 3 is a schematic diagram of an array substrate, according to embodiments of the disclosure.

FIG. 3 is a schematic diagram of an array substrate, according to embodiments of the disclosure. The array substrate is based on the array substrate shown in FIG. 2A, and may be employed in a liquid crystal display panel. In the array substrate, as described above, a signal is transmitted to each sub-pixel unit 111 via the corresponding data line 110 in the display phase, and a signal to or from the touch electrode is transmitted via at least one data line 110 in the touch phase, therefore, in the display phase, the data line 110 is electrically connected with the sub-pixel unit 111 and is disconnected from the touch electrode, and in the touch phase, the data line 110 is electrically connected with the corresponding touch electrode and is disconnected from the sub-pixel unit 111. In the liquid crystal display panel, the sub-pixel unit 111 includes a pixel electrode 113, and electrically connecting the data line 110 with or disconnecting the data line 110 from the sub-pixel unit 111 refers to electrically connecting the data line 110 with or disconnecting the data line 110 from the pixel electrode 113 in the sub-pixel unit 111.

In the array substrate shown in FIG. 2A for example, the data line 110 is electrically connected with the corresponding touch electrode in the touch phase and disconnected from the touch electrode in the display phase, under the control of the first thin film transistor. In order to control the data line 110 to be electrically connected with the corresponding sub-pixel unit 111 in the display phase and disconnected from the sub-pixel unit 111 in the touch phase, each sub-pixel unit 111 is provided with a second thin film transistor 112, and the data line 110 is electrically connected with the pixel electrode 113 in the corresponding sub-pixel unit 111 via the second thin film transistor 112. A gate electrode of the second thin film transistor 112 is electrically connected with the scan line 120, a source electrode of the second thin film transistor 112 is electrically connected with the data line 110, and a drain electrode of the second thin film transistor 112 is electrically connected with at least one pixel electrode 113.

In the display phase, the second thin film transistor 112 is turned on under the control of the scan line 120, and the first thin film transistor is turned off under the control of the control signal line 160, so that a signal is transmitted to the pixel electrode 113 via the data line 110; while in the touch phase, the second thin film transistor 112 is turned off under the control of the scan line 120, and the first thin film transistor 112 is turned on under the control of the control signal line 160, so that at least one data line 110 is reused as the signal line for the touch electrode to transmit a signal to or receive a signal from the touch electrode.

It is noted that the array substrate shown in FIG. 3 can also be employed in the organic light emitting diode (OLED) display panel, where each sub-pixel unit includes an OLED light emitting unit and is further provided with a third thin film transistor. A gate electrode of the third thin film transistor is electrically connected with the scan line 120, a source electrode of the third thin film transistor is electrically connected with the data line 110, and a drain electrode of the third thin film transistor is electrically connected with at least one OLED light emitting unit, that is, the data line 110 is electrically connected with the corresponding OLED light emitting unit via the third thin film transistor.

Figure 4A:
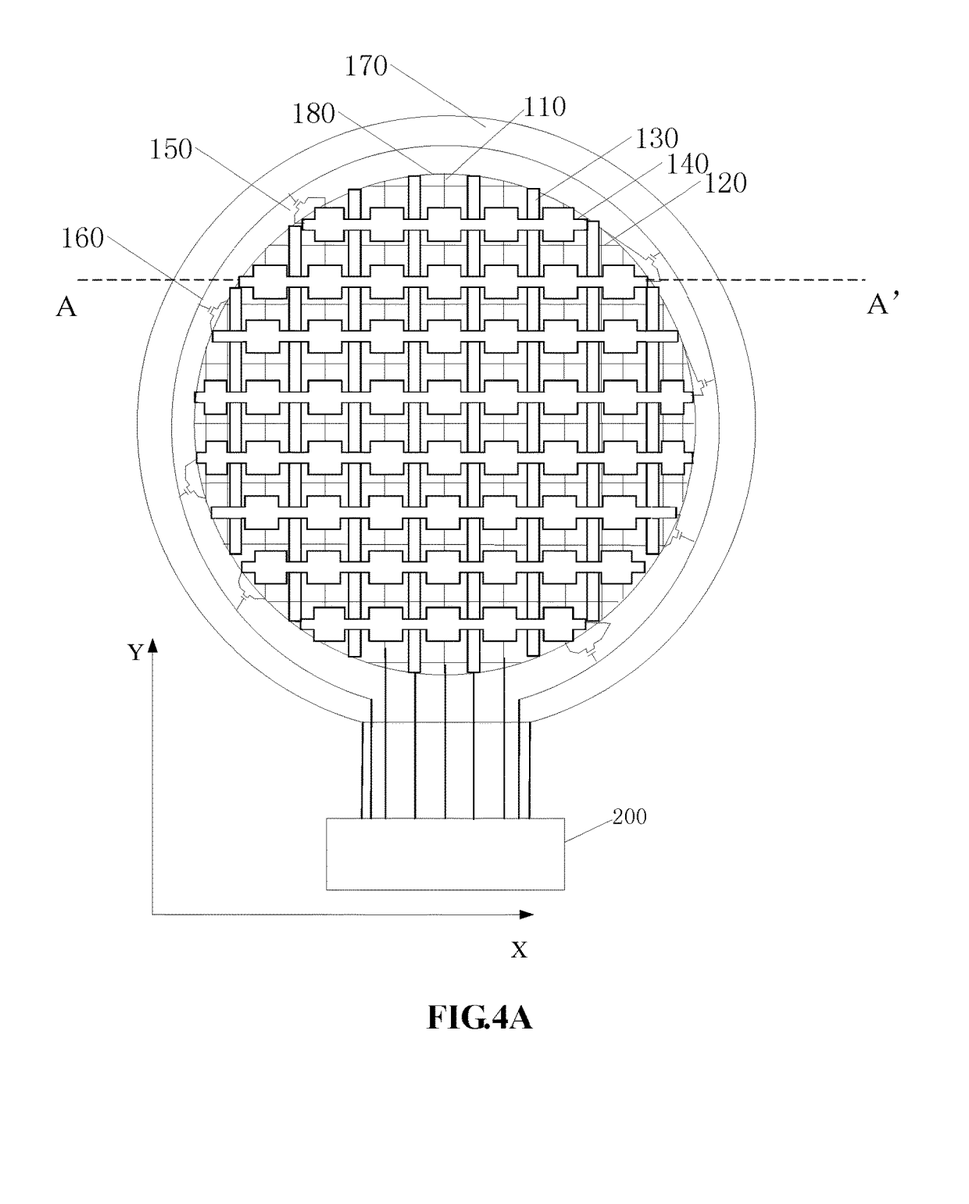
FIG. 4A is a schematic top view of a display panel, according to embodiments of the disclosure.
Figure 4B:
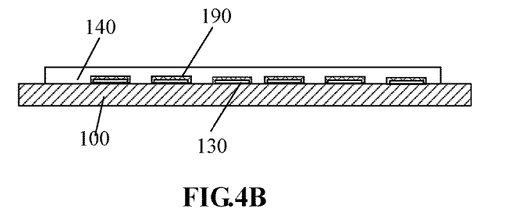
FIG. 4B is a cross-sectional view of the display panel, according to embodiments of the disclosure.

FIG. 4A is a schematic top view of a display panel, according to embodiments of the disclosure. As shown in FIG. 4A, the display panel includes the array substrate described in any of the embodiments of the disclosure. The array substrate is based on the array substrate shown in FIG. 2A. The non-display region 170 of the array substrate is provided with an integrated circuit 200, the data lines 110 are directly connected with the integrated circuit 200, at least one touch electrode is connected to the integrated circuit 200 by the corresponding data line 110, other touch electrodes not connected with the data lines 110 are connected to the integrated circuit 200 by the signal lines for these touch electrodes at the non-display region 170, and the control signal line 160 is also connected with the integrated circuit 200. Optionally, the display panel is a liquid crystal display panel or an organic light emitting display panel. FIG. 4B is a cross-sectional view of the display panel taken along a line A-A', where, the drive electrodes 130 intersect the touch sensing electrodes 140 and are insulated from the touch sensing electrodes 140 by the insulation layer 190 on the array substrate.

With the display panel, according to embodiments of the disclosure, in the display phase, a signal is transmitted via the data line to the sub-pixel unit; while in the touch phase, the data line is reused as the signal line for the corresponding touch electrode to transmit a signal to or receive a signal from the touch electrode. The different roles of the data line in the display phase and the touch phase reduces the signal lines for the touch electrodes in the non-display region of the display panel, saves the area of the non-display region occupied by the signal lines for the touch electrodes, and achieves the narrow border frame of the display panel.

It should be noted that the above description describes embodiments and technical principles of the present disclosure. Those skilled in the art will understand that the disclosure is not limited to the embodiments described herein, and various apparent changes, rearrangements and substitutions may be made by those skilled in the art without departing from the scope of the disclosure. Therefore, although the disclosure has been described in detail as above in connection with the embodiments, the disclosure is not to limit thereto and may include other embodiments without departing from the scope of the disclosure Various modifications and additions can be made to the exemplary embodiments discussed without departing from the scope of the disclosure. For example, while the embodiments described above refer to particular features, the scope of the disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. An array substrate, comprising:
   a plurality of data lines;
   a plurality of scan lines;
   an integrated circuit;
   a plurality of sub-pixel units; and
   a plurality of touch electrodes,
   wherein the plurality of data lines comprises a multiplexed data line,
   wherein a first terminal of the multiplexed data line is electrically connected to the integrated circuit,
   wherein a second terminal of the multiplexed data line is configured to be: electrically connected to one of the plurality of touch electrodes in a touch phase, electrically connected to one of the plurality of sub-pixel units and electrically disconnected from the one of the plurality of touch electrodes in a display phase, and electrically disconnected from the one of the plurality of sub-pixel units in the touch phase.

2. The array substrate according to claim 1, further comprising a first switch,
   wherein a first terminal of the first switch is connected to the second terminal of the multiplexed data line, and a second terminal of the first switch is connected to the one of the plurality of touch electrodes,
   wherein each of the plurality of sub-pixel units comprises a second switch and a pixel electrode, a first terminal of the second switch is connected to the second terminal of the multiplexed data line, and a second terminal of the second switch is connected to the pixel electrode,
   wherein in the touch phase the first switch is turned on and the second switch is turned off, and in the display phase the first switch is turned off and the second switch is turned on.

3. The array substrate according to claim 2, wherein the integrated circuit is configured to transmit a display signal to the pixel electrode in the display phase.

4. The array substrate according to claim 2, wherein the plurality of touch electrodes comprise a touch driving electrode and a touch sensing electrode, the one of the plurality of touch electrodes that is connected to the second terminal of the first switch is the touch driving electrode, and the integrated circuit is configured to transmit a driving signal to the touch driving electrode via the multiplexed data line in the touch phase, such that a sensing signal is generated on the touch sensing electrode in response to the driving signal.

5. The array substrate according to claim 4, wherein the touch driving electrode and the plurality of data lines extend in a first direction, and the touch sensing electrode and the plurality of scan lines extend in a second direction.

6. The array substrate according to claim 4, wherein the touch driving electrode and the plurality of scan lines extend in a first direction, and the touch sensing electrode and the plurality of data lines extend in a second direction.

7. The array substrate according to claim 4, wherein the touch driving electrode intersects the touch sensing electrode, and the touch driving electrode and the touch sensing electrode are arranged at different layers.

8. The array substrate according to claim 2, wherein the plurality of touch electrodes comprise a touch driving electrode and a touch sensing electrode, the one of the plurality of touch electrodes that is connected to the second terminal of the first switch is the touch sensing electrode, and the integrated circuit is configured to receive a sense signal from the touch sensing electrode via the multiplexed data line in the touch phase, which is generated in response to a driving signal on the touch driving electrode.

9. The array substrate according to claim 8, wherein the touch driving electrode and the plurality of data lines extend in a first direction, and the touch sensing electrode and the plurality of scan lines extend in a second direction.

10. The array substrate according to claim 8, the touch driving electrode and the plurality of scan lines extend in a first direction, and the touch sensing electrode and the plurality of data lines extend in a second direction.

11. The array substrate according to claim 8, wherein the touch driving electrode intersects the touch sensing electrode, and the touch driving electrode and the touch sensing electrode are arranged at different layers.

12. The array substrate according to claim 2, wherein the first switch is a first thin film transistor and the second switch is a second thin film transistor, a gate electrode of the first thin film transistor is electrically connected to a control signal line, and a gate electrode of the second thin film transistor is electrically connected to one of the plurality of scan lines.

13. The array substrate according to claim 2, wherein the array substrate has a display region and a non-display region, the first switch and the integrated circuit are in the non-display region, and the second switch is in the display region.

14. The array substrate according to claim 13, wherein the display region is circular.

15. The array substrate according to claim 13, wherein the display region has a polygonal shape, and an included angle between an extending direction of the data line and an edge of the display region is unequal to 0 degree, 90 degrees or 180 degrees.

16. An array substrate, comprising:
an integrated circuit;
a plurality of data lines, wherein a first terminal of each of the plurality of data lines is electrically connected to the integrated circuit;
a plurality of scan lines;
a plurality of sub-pixel units each comprising a first switch and a pixel electrode, wherein a first terminal of the first switch is electrically connected to a second terminal of one of the plurality of data lines, and a second terminal of the first switch is electrically connected to the pixel electrode; and
a plurality of touch electrodes;
wherein the plurality of data lines comprises a multiplexed data line, a second terminal of the multiplexed data line is electrically connected to one of the plurality of touch electrodes via a second switch.

17. The array substrate according to claim 16, wherein a first terminal of the second switch is electrically connected to the multiplexed data line, and a second terminal of the second switch is electrically connected to the one of the plurality of touch electrodes, and wherein in a touch phase the first switch is turned off and the second switch is turned on, and in a display phase, the first switch is turned on and the second switch is turned off.

18. The array substrate according to claim 17, wherein the integrated circuit is configured to transmit a display signal to the pixel electrode in the display phase.

19. The array substrate according to claim 18, wherein the integrated circuit is further configured to transmit a driving signal to the one of the plurality of touch electrodes via the multiplexed data line in the touch phase.

20. The array substrate according to claim 18, wherein the integrated circuit is further configured to receive a sensing signal to the one of the plurality of touch electrodes via the multiplexed data line in the touch phase.

* * * * *